United States Patent [19]

Gillemot et al.

[11] 3,725,581
[45] Apr. 3, 1973

[54] RE-ENTERABLE CABLE SPLICE ASSEMBLY AND METHOD INCLUDING PROVISION FOR ADDING BRANCHOUT SERVICE CABLES AS NEEDED

[76] Inventors: George W. Gillemot, 2331 20th St., Santa Monica 90405; John T. Thompson, 244 Loring St., Los Angeles, both of Calif. 90024

[22] Filed: Aug. 2, 1971

[21] Appl. No.: 168,178

[52] U.S. Cl. ............174/38, 29/628, 174/60, 174/76, 174/77 R, 174/78
[51] Int. Cl. ............H02g 9/02, H02g 15/04
[58] Field of Search ..174/10, 17 R, 18, 19, 20, 21 R, 174/22 R, 23 R, 37, 38, 60, 72 R, 74 A, 75 R, 76, 77 R, 87, 88 R, 91, 93, 78; 29/592, 628

[56] References Cited

UNITED STATES PATENTS

| | | | |
|---|---|---|---|
| 586,464 | 7/1897 | Tobey | 174/60 |
| 3,435,124 | 3/1969 | Channell | 174/38 |
| 3,466,379 | 9/1969 | Lohman | 174/38 |
| 3,557,299 | 1/1971 | Dienes | 174/38 |

OTHER PUBLICATIONS

Electrical World, Mar. 11, 1968, page 53.

Primary Examiner—Laramie E. Askin
Attorney—W. D. Sellers et al.

[57] ABSTRACT

A re-enterable cable splice enclosure or assembly and method for adding branchout service cable connections to a main cable as needed. The splice housing includes first and second separable parts one of which has a main cable sealed thereto along with a plurality of tubular passages adapted to receive additional service cables as needed with provision for maintaining the passage sealed by potting compound. The tubular passages are preferably chargeable with a non-setting permanent gel-like potting compound. The assembly includes provision for using shielded cables the shield jackets of which are seperably connectable to one another and having shield junctions submerged in potting compound.

24 Claims, 6 Drawing Figures

PATENTED APR 3 1973

INVENTORS.
GEORGE W. GILLEMOT
JOHN T. THOMPSON
BY
ATTORNEYS

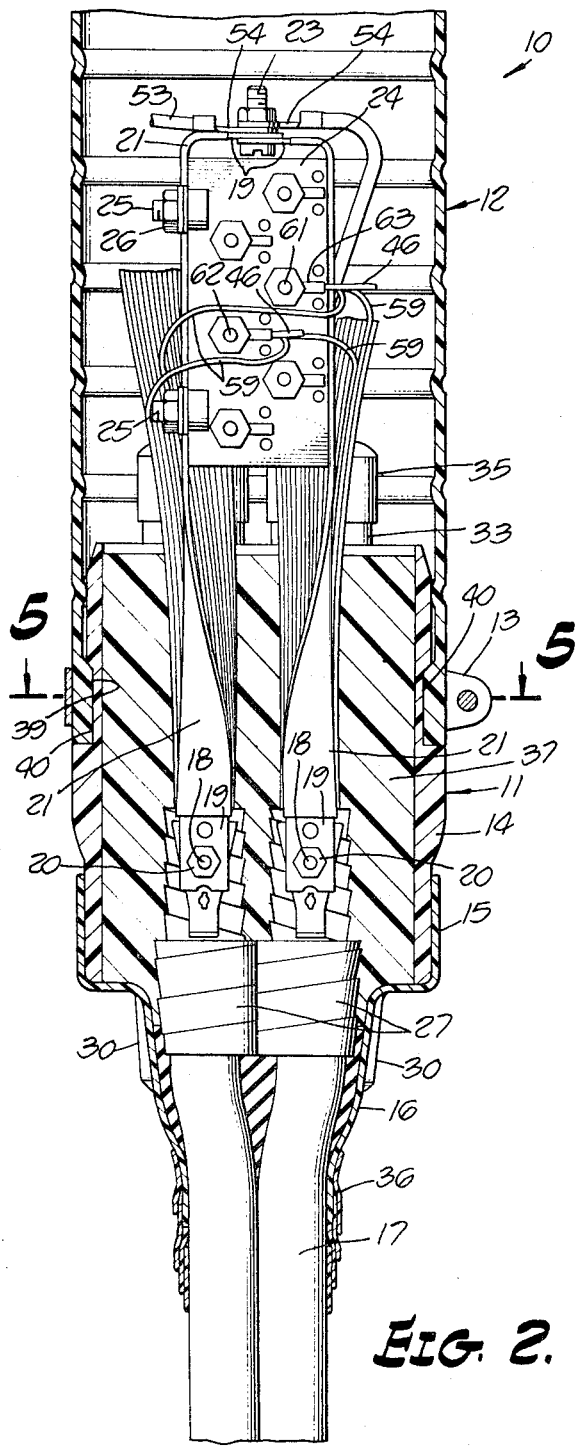
FIG. 2.
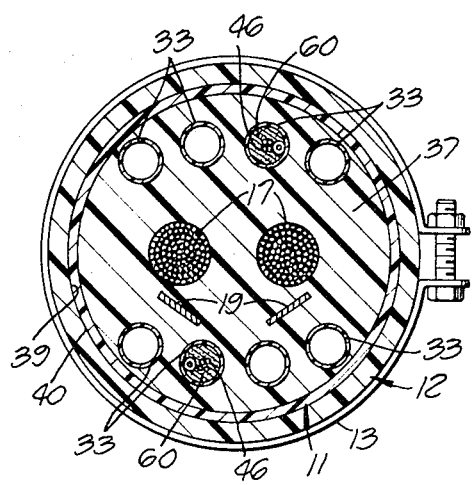
FIG. 5.
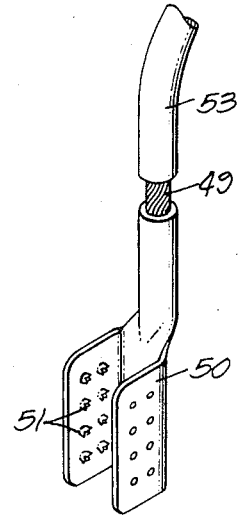
FIG. 6.
INVENTORS.
GEORGE W. GILLEMOT
JOHN T. THOMPSON
BY
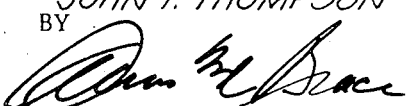
ATTORNEYS

RE-ENTERABLE CABLE SPLICE ASSEMBLY AND METHOD INCLUDING PROVISION FOR ADDING BRANCHOUT SERVICE CABLES AS NEEDED

This invention relates to cable splice assemblies, and more particularly to an improved, highly versatile, re-enterable cable splice enclosure or assembly the main cable entrance of which is permanently sealed closed along with tubular passages therethrough through which branchout service cables may be installed at later dates and as needed and sealed closed with potting compound.

Utility and communication cables serving inhabited areas are customarily installed long before the full service capacity of the cable has been developed. Despite careful surveys and studies of anticipated future needs it is not possible to accurately predict and provide for the requisite service connections at each interval along the cable. It has therefore been customary to install an excessive number of branchout cables at each splice assembly many of which are never needed. In consequence the total number of service connections provided for are grossly in excess of actual needs.

The present invention avoids the serious and costly disadvantages of prior practice and provides a re-enterable cable splice assembly of the general type disclosed in out copending application for U.S. Letters Pat. Ser. No. 71,149, filed Sept. 10, 1970, and embodies certain improvements over that construction. For example, the new assembly comprises two principal housing subassemblies separably clamped together to provide an enclosure for the cable splice connections and associate auxiliaries and including special provision for installing service cables only when and as needed, thereby avoiding the time and cost of standby branchout cables. By this technique it is feasible to install the new splice assembly at regular intervals but with some or no branchout cables depending on actual service needs at each location. One of the housing sub-assemblies includes the requisite number of preformed passages through the wall of the assembly required to meet all conceivable future needs. These passages are initially sealed closed and remain unoccupied until needed. At that time, one or more of the passages is opened and readied for the insertion of a branchout cable which, upon being installed, is sealed to the housing with potting compound. Both ends of the tubular passages are preferably sealed closed until needed, a soft, flexible cap preferably being employed. Prior to inserting a cable, this cap is slit and fits snugly about the cable as the latter is inserted and sealed with a charge of potting compound. A preferred potting compound comprises a permanently non-setting, gel-like waterproof substance providing a highly reliable seal between the cable and the passage wall and permitting the withdrawal of the cable should this become desirable for any reason. If a permanent installation is desired, a setting compound may be used to seal the tubular passage. The new assembly includes provision for bonding grounding conductors to both the main and the service cable shields. The grounding conductors are separably connectable to one another interiorly of the splice assembly to facilitate testing.

Accordingly it is a primary object of the present invention to provide a new and improved re-enterable cable splice assembly and method of connecting branchout service cables thereto.

Another object of the invention is the provision of a simplified highly reliable cable splice assembly which, once installed, can be serviced thereafter by relatively low skill technicians to connect service cables thereto.

Another object of the invention is the provision of a foolproof, re-enterable splice assembly one part of which is provided with a plurality of passageways any one through which service cables can be installed without risk of degrading the hermetically sealed character of the seal to the main cable and the splice housing.

Another object of the invention is the provision of a re-enterable splice assembly having a terminal strip installed therein equipped with posts to which additional service cables can be connected after insertion and sealing to access passages formed through the wall of the splice housing at the time of its initial installation.

These and other more specific objects will appear upon reading the following specification and claims and upon considering in connection therewith the attached drawing to which they relate.

Referring now to the drawing in which a preferred embodiment of the invention is illustrated:

FIG. 2 is a view similar to FIG. 1 but showing the lower portion of the splice assembly in cross section;

FIG. 5 is a cross sectional view taken along line 5—5 on FIG. 2; and

FIG. 6 is a fragmentary perspective view of one end of the bonding wire for the shield jacket of a service cable.

Figure 1:
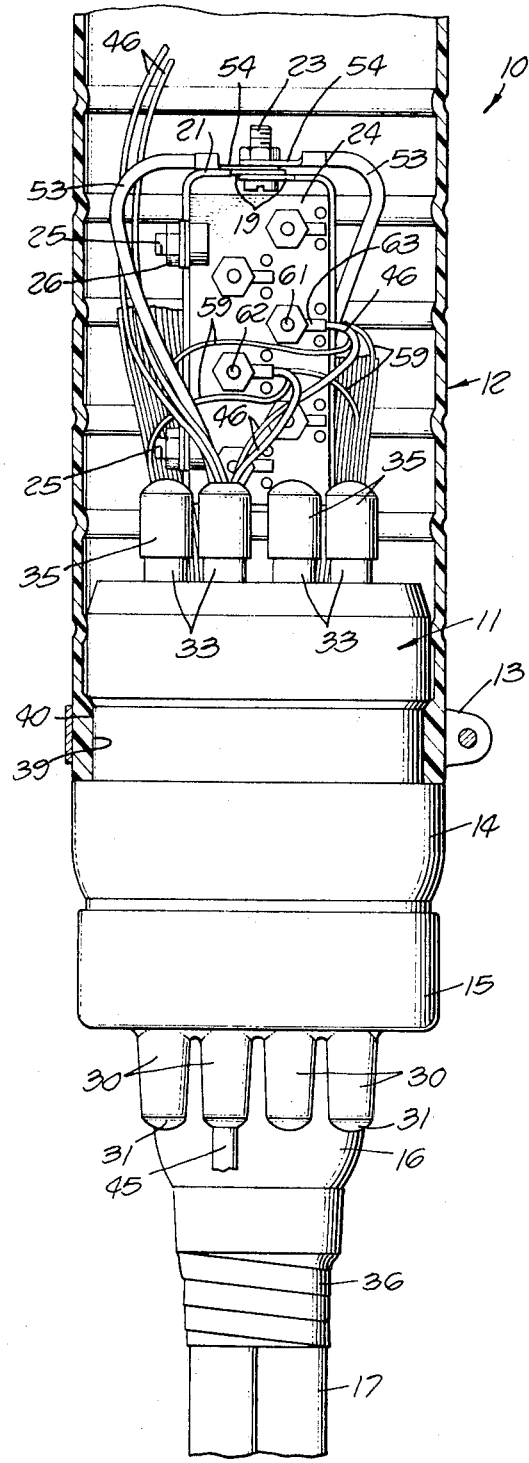
FIG. 1 is a fragmentary side elevational view of an illustrative embodiment of a splice assembly according to this invention and showing the removable housing cap broken away.

Referring initially more particularly to FIG. 1, there is shown an illustrative embodiment of the invention cable splice assembly, designated generally 10, including as its principal sub-assemblies, a base housing member 11 and a cap housing member 12 normally held telescopically clamped together by a clamping band 13. As is made clear by FIG. 2, base 11 comprises a rigid tube 14 and a cup shaped bottom 15 formed of supple, impervious, molded plastic having a resilient neck 16 through which the legs of a loop of the main cable 17 project. As is well known to those experienced in the use of utility cables, main cable 17 contains a multiplicity of smaller conductors and is laid along a right of way extending past various present and prospective future customers. At intervals along the cable a loop is formed and enclosed within an access splice assembly from which individual service cables extend to the premises of service subscribers. Such a system is described in greater detail in our copending application Ser. No. 71,149, filed Sept. 10, 1970.

The return bend portion of the loop is stripped of its outer sheath and a major portion of the underlying electrical shielding jacket following which bonding assemblies 18,18 are assembled to these jackets in the manner described in detail in the aforementioned copending application to provide a strong electrical and mechanical connection to the cable shield jacket on each leg of the main cable. Heavy duty ductile metal bonding straps 19,19 are then clamped to the outer end of the bonding assembly 18 by nuts 20. These straps extend upwardly and are preferably encased in a flexible insulative sheath 21. Their upper ends terminate near the closed upper end of the splice housing cap member 12 where they are secured together by a bolt 23. As there shown the straps lie along either edge of a terminal strip 24 having studs 25 projecting from one edge strip and passing through one of the many holes customarily present along these strips. Nuts 26 assembled over these studs hold the terminal strips rigidly supported centrally of the upper end of the splice housing.

After these operations have been completed, each leg of the cable loop is served with wrappings of tape 27 in an area immediately below the bonding assembly to aid in holding the cable legs centered in neck 16 while the base unit is charged with potting compound.

Figures 3, 4:
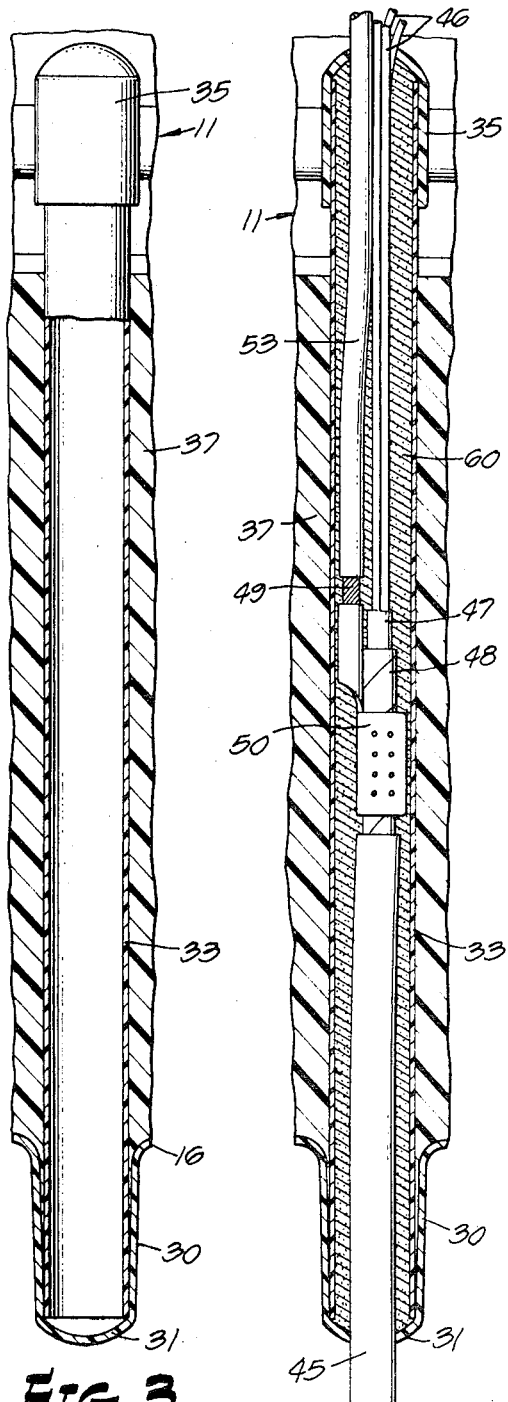
FIGS. 3 and 4 are fragmentary sectional views through one of the service cable passages before and after installation of a service cable.

Referring now to FIG. 1 it will be noted that the opposite lateral sides of the generally rectangular shaped neck 16 is provided with a number of tubular bosses 30,30, there being four such bosses along either side of the longer sidewall of the neck. These bosses are molded integrally with the bottom of the cup-shaped bottom 15 and initially the bottom of each is closed by an integral closure 31. Seated within and having a firm frictional fit with the interior sidewall of each of the bosses 30 is a non-conductive tube 33 (FIGS. 3, 4). These tubes extend upwardly through the lower housing member 11 of the splice assembly with their upper ends terminating somewhat above the upper edge of the base member. The upper ends of these tubes are preferably provided with snug fitting resilient caps 35 to safeguard against the entrance of moisture and foreign matter.

Once tubes 33 have been installed in each of the tubular bosses 30, base member 11 is ready for charging with potting compound. The cable legs are pulled into proper position with the collars of tape 27 located as shown. The lower rim edges of neck 16 are then held pressed firmly against the cable by servings of tape 36. Thereafter the base member is supported in an upright position and filled with fluid potting compound 37 to a level approaching the upper rim edge of the base, as is best shown in FIG. 2. A thermosetting compound is preferably used but compounds of various well known types may be used. As the compound takes a set, it bonds the base unit firmly to the legs of the cable loop so that all parts of the base subunit are hermetically sealed and bonded together.

At this stage the flexible walled impervious housing cap 12 may be assembled to base 11 to seal all internal parts of the splice assembly closed. As is made clear in FIGS. 1 and 2 the lower rim edge 39 of cap 12 is thickened inwardly and seats in a complementally shaped groove 40 surrounding the midportion of base member 14. Owing to the flexibility and resiliency of cap 12, its rim is readily stretched to seat in groove 40 in which it is firmly clamped by tightening band clamp 13. This sealed condition is maintained despite wide range temperature changes. The flexible walls of cap 12 permit this cap to collapse inwardly on cooling and to balloon slightly on heating.

Whenever there is need for service connections to splice assembly 10, a service cable can be connected to the splice assembly with a minimum of effort and without risk of interfering with the hermetic integrity of the main cable to the splice housing. The installer first removes clamping band 13 and detaches cap 12 from base unit 11. He then cuts a slit crosswise of bottom 31 of one of the bosses 30 and a similar slit across the top of the associated cap 35. A conventional shielded service cable 45 is then inserted through the slit in boss 30 and upwardly through tube 33. Usually cap 35 is removed during this assembly operation and a short length of the cable is pulled outwardly past the upper end of tube 33 to facilitate making a bonding connection to the cable shield.

It will be understood that the service cable is of the customary type enclosing two pairs of insulated conductors 46 surrounded by a thin wrapping of insulation 47 (FIG. 4), a conductive electrical shield 48 and the usual outer sheath.

After appropriate lengths of these several layers are removed, a bonding conductor 49 having a soft U-shape metal ferrule 50 secured thereto is clamped about shield 48. This ferrule has the general configuration shown in FIG. 6 and preferably includes a plurality of burrs 51 protruding from its inner surface which penetrate into the electrical shield as the legs of the ferrule are clenched snugly against the shield. Bonding conductor 49 includes a covering of insulation 53 and its upper end is provided with a terminal fitting 54 held clamped to bonding straps 19 by bolt 23. In this manner assurance is provided that the shield of each service cable will be connected to the shields of each leg of the main cable.

After the bonding conductor has been secured to the service cable, the latter may be pulled backwardly to the lower end of tube 33 until the bonding ferrule 50 is located approximately midway between the opposite ends of this tube. Prior to replacing cap 35 over the upper end of tube 33, the tube is charged with potting compound 60. By preferance a non-setting gel-like potting compound of the type disclosed in our copending application Ser. No. 12,617, filed Feb. 19, 1970, now U.S. Pat. No. 3,585,275, is employed. The use of such a compound permits the service cable to be replaced at some later date should this become desirable for any reason. However, it will be understood that a solidifying compound may be employed in lieu of the gel type compound. The tubes may be precharged with the gel type compound, a practice which avoids the need for charging the compound in the field. However, some installers object because this compound has very pronounced cohesive properties and coats the terminal end of the cable with this compound during its insertion through the tube. Accordingly after it has been inserted through the gel it is necessary to wipe away the excess from a length of the cable while installing the bonding unit 49,50.

The gel charging operation is accomplished using a collapsible dispenser for the gel while its nozzle is inserted into the end of the tube. Air displaced by the gel escapes from the opposite end of the tube. Once the tube has been completely charged and the cap replaced, cable 45 is firmly supported by the long charge of compound which provides complete assurance against any possibility of moisture, foreign matter or air entering the interior of the closed splice assembly.

The next step is to connect each of a pair of the service cable conductors 46 to respective posts 61,62 of terminal board 24 along with a selected conductor 59 from the exposed loop portion of the main cable. The main cable conductor is not cut in the usual practice with the result that each post appears to have three wires connected to the terminal lugs 63. The other pair of conductors in the service cable may be capped and retained as spares for future service if needed.

Additional service cables 45 can be added at any time following the same technique and procedure outlined above and using successive ones of the binding posts on terminal strip 24. These operations are performed by the utility installers and do not require the services of skilled splicers.

While the particular re-enterable cable splice assembly and method including provision for adding branchout service cables as needed herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. A re-enterable cable splice assembly having provision for adding successive service branchout cables comprising: a relatively deep cup-shaped base having provision in the bottom thereof for receiving and sealing the same about the legs of a loop formed in a main cable extending upwardly through the bottom of said base, at least one long tubular passage passing through the bottom of said base of adequate size to accommodate a branchout service cable, means for maintaining said passage sealed against the passage of fluids therethrough until used to house a service cable at which time said passage is chargeable with potting compound to seal a service cable to the wall of said passage, and removable inverted cup-shaped cap means telescoped over the exterior of said base and including means for holding the same releasably clamped to said base to enclose and seal the loop portion of a main cable except when access to the loop is necessary for inspection, testing and making splice connections to cabling assembled thereto, the cable sheath being removed from said loop to a level below the upper rim edge of said base, and said base being charged with solidified potting compound to a level above the point of sheath removal from said loop.

2. A splice assembly as defined in claim 1 characterized in that said base includes a plurality of said long passages each adapted for use to house a separate service cable at any time there is need for additional service outlet connections to said main cable.

3. A splice assembly as defined in claim 2 characterized in that said passages for service cables are arranged generally parallel to one another and to the axis of said splice enclosure with one end of each opening into the interior of said splice assembly and with the other end of each opening outward through the bottom of said base.

4. A splice assembly as defined in claim 2 characterized in that said solidified potting compound is effective to hold the legs of said cable loop permanently sealed thereto, said base including a plurality of initially closed tubular bosses projecting outwardly from the bottom thereof and in communication with the lower end of a respective one of said tubular passages, and the closure for said tubular bosses being rupturable to receive a service branchout cable when there is need for the latter.

5. A splice assembly as defined in claim 4 characterized in the provision of cap means on the inner end of each of said tubular passages.

6. A splice assembly as defined in claim 4 characterized in that said tubular passages are formed by tube means having its opposite ends extending beyond the opposite ends of said charge of permanently solidified potting compound in said base.

7. A splice assembly as defined in claim 4 characterized in that said base is formed of supple molded elastomeric material including said tubular bosses projecting outwardly from the bottom thereof.

8. A splice assembly as defined in claim 7 characterized in the provision of a tube having a snug fit with the interior walls of said tubular bosses and inserted therein before said base is charged with said potting compound to provide said tubular passages for future use to house individual service branchout cables.

9. A splice assembly as defined in claim 8 characterized in the provision of a removable rupturable supple cap for the inner ends of each of said tubes.

10. A splice assembly as defined in claim 1 characterized in that said tubular passage is chargeable with a permanently non-setting moisture proof gel-like potting compound effective to form a leak-proof seal between a service cable and the walls of said passage.

11. A splice assembly as defined in claim 10 characterized in that said splice assembly includes disconnectable conductive means for separably interconnecting the shields of a shielded main cable and of one or more shielded branchout cables when said splice assembly is used with such cables.

12. A splice assembly as defined in claim 1 characterized in the provision of terminal strip means overlying said base along side said loop and having provision for connecting conductors of said main cable to conductors of a service cable entering said splice assembly through said one tubular passage, and support means for said terminal strip means extending downwardly therefrom with the lower end thereof submerged in and rigidly supported by said solidified potting compound.

13. A splice assembly as defined in claim 12 characterized in that said support means is conductive, said main cable including a conductive shield jacket, and conductive means for clamping the shield jacket on each leg of said loop to said support means in an area submerged in said solidified potting compound.

14. A splice assembly as defined in claim 1 characterized in that said cup-shaped base includes a generally cylindrical portion of rigid elastomeric material and a low-height cup-shaped bottom of relatively thin supple elastomeric material having a plurality of initially closed tubular nipples each seating the lower end of one of a plurality of tubes each sized to accommodate a service cable connectable to conductors of said main cable interiorly of said splice assembly.

15. A re-enterable cable splice assembly having provision for adding service branchout cables at any time with provision for sealing the same to said assembly at the point of entry thereto, said assembly including a normally closed main housing comprising first and second supple cup-shaped members and a rigid tubular member interconnecting said first and second housing members, said first member having a looped portion of a main cable extending through and sealed within an opening through the wall thereof, long tubular means sealed to and passing through the wall of said first member and sized to accommodate at least one service cable and closed until needed to house a service cable, and said tubular means being chargeable with potting compound to provide a moisture and fluid proof seal between a service cable and the interior walls of said tubular means.

16. A splice assembly as defined in claim 15 characterized in that said tubular means is supported through the wall of said first housing member and passes through potting compound sealing the main cable assembled to said first member.

17. A splice assembly as defined in claim 15 characterized in that said first housing member is arranged to have said main cable enter through the bottom thereof, and said bottom having a plurality of tubular bosses projecting outwardly therefrom each adapted to snugly seat a non-conductive tubular means initially closed at its opposite ends and extending inwardly beyond the charge of potting compound holding the main cable and said tubular means assembled to said first housing member.

18. A splice assembly as defined in claim 17 characterized in that said tubular means include a charge of non-setting gel-like potting compound forming a fluid tight seal with the walls thereof and with the surface of a service cable passing therethrough.

19. That method of providing a re-enterable cable splice assembly for a main cable and having provision for the connection of additional service cables thereto at any time there is need for expanded service, said method comprising: providing a splice housing having first and second telescopically mateable cup-shaped members clampable together between their overlapping rim edges, installing a main cable through the bottom of said first member, installing a plurality of tubes lengthwise of the interior of said first member and beside said cable, charging said first member with a setting potting compound to seal said member, cable and tubes assembled to one another, installing service cables as needed through first one and then another of said tubes and connecting the same to conductors of said main cable, charging a tube having a service cable therein with potting compound, and maintaining tubes not occupied by a service cable closed until needed.

20. That method defined in claim 19 characterized in the steps of connecting a conductive grounding member to the shielding jacket of said main cable in an area to be submerged in potting compound with an end of said conductive member exposed interiorly of said splice housing, providing the shielding jacket of a service cable with a grounding member secured thereto and extending from the inner end of one of said tubes after the service cable has been installed therein, and connecting the free ends of said grounding members together interiorly of said first and second housing members before assembling said members to one another thereby to provide a separable electrical connection between the shields of each of said cables.

21. That method defined in claim 19 characterized in the step of charging a tube with non-setting gel-like potting compound after a service cable has been pulled into position through that tube.

22. That method defined in claim 19 characterized in the steps of providing the opposite ends of said tubes with supple elastomeric caps normally effective to seal the opposite ends of said tubes, and slitting the bottoms of said caps preparatory to inserting the end of a service cable therethrough.

23. A re-enterable cable splice enclosure for use in making normally sealed but readily accessible splice connections between a looped portion of a main cable and one or more service cables, said splice enclosure comprising: a generally tubular base of rigid molded material capped at one end by a cup-shaped bottom member of relatively supple elastomeric material, said bottom member having a resilient tubular neck adapted to be gathered about the legs of a cable loop insertable therethrough and upwardly through said tubular base, said bottom member having a plurality of tubular bosses each seating the lower end portion of a tube extending upwardly through said base to a level thereabove and adapted to embrace a service cable spliceable to conductors of a main cable, said base and bottom member being chargeable with solidifiable potting compound, said tubes being closed until needed and being individually chargeable with potting compound if and when needed to accommodate a service cable, and an inverted cup-shaped cap having a telescopic fit over the upper end of said base and including means for securing the same detachably assembled over the upper end of said base.

24. A re-enterable cable splice enclosure as defined in claim 23 characterized in the provision of terminal strip means having a non-conductive main body, a pair of conductive supports having one end secured to said terminal strip means and the other end equipped with clamping means for clamping said supports to the shield jacket of a shielded main cable in an area located within and between the opposite ends of said base and adapted to be submerged in potting compound when said base is charged therewith, and said terminal strip means having provision for interconnecting conductors of a main cable and of one or more service cables.

* * * * *